May 12, 1953 D. R. BUCHELE ET AL 2,638,033
UNITARY CATADIOPTRIC OBJECTIVE LENS SYSTEM
Filed Dec. 19, 1950

Inventors
DONALD R. BUCHELE
WILLIAM M. BUCHELE

Patented May 12, 1953

2,638,033

UNITED STATES PATENT OFFICE 2,638,033

UNITARY CATADIOPTRIC OBJECTIVE LENS SYSTEM

Donald Robert Buchele, Cleveland, and William Martin Buchele, Toledo, Ohio

Application December 19, 1950, Serial No. 201,612

8 Claims. (Cl. 88—57)

This invention relates to a catadioptric optical system yielding a 360 degree panoramic image both above and below the horizon. More specifically it is directed to an optical system having a positive power lens and a positive power mirror on a common optical axis. Light emitted from selected object points passes through the convex refracting surface, an entrance pupil and is reflected from a concave surface to form a real image between the refracting surface and the reflecting surface. The light then passes through an exit pupil at which the eye or a camera or other optical system may be placed for observation of the image.

The present improvements provide for simple correction of aberrations because of the relatively small angles of incidence of light rays upon the optical surfaces and a negative Petzval sum contributed by the concave mirror. Contemplated use of the invention includes use in periscopes and vision devices for submarines, army tanks and other military and civil application.

The book "Fundamentals of Optical Engineering" 1943 by Donald H. Jacobs describes two prior methods used in submarine periscopes. Both are stated to possess excessive optical aberrations. Panoramic optical systems are described in British Patents Number 239,677 and Number 258,755, and the book by W. Merte, R. Richter and M. v. Rohr, "Das Photographische Objectiv," published in America by Edwards Brothers, Incorporated, Ann Arbor, Michigan, page 363. With this invention, straightforward methods of correction are possible because of the negative Petzval sum contributed by the concave mirror and the small angles of incidence of the light rays as mentioned above. The improvements retain essentially all the advantages of prior systems in addition to those provided by the present novel arrangement.

The novel system is adapted to special uses some of which are illustrated herewith. For example, in addition to observing in one field a full 360 degree panorama both above and below the horizon, it may be designed so that a major fraction of the field is either above or below the horizon. Also the center of the field may be utilized for a telescope to scan the panorama at a greater magnification than is inherent in a panoramic view.

It will further be noted that the reflecting mirror surface is protected from weather conditions which of course materially contributes to long life of the instrument.

An object of the present invention is to provide a unitary optical system which includes centered surfaces of spherical curvature in a basic design that has a minimum of image aberration, in particular a flat field, thereby permitting a fast or wide aperture system that can at the same time cover an extremely wide field angle, to wit, greater than 180°.

Another object of the invention is to provide an optical system of the catadioptric type having a positive power refracting surface and a positive power reflecting surface both on a common optical axis.

Another object is to provide such a system which may be modified to have the major fraction of its field either above or below the horizon.

Another object is to provide a unitary catadioptric optical system giving a full 360 degree panorama.

Another object is to provide a catadioptric system in which the center of the field may be utilized for a telescope to scan the panorama at a greater magnification than is inherent in a panoramic view.

These and other objects will be manifest from a consideration of the following descriptive claims and drawings in which:

Figure 1:
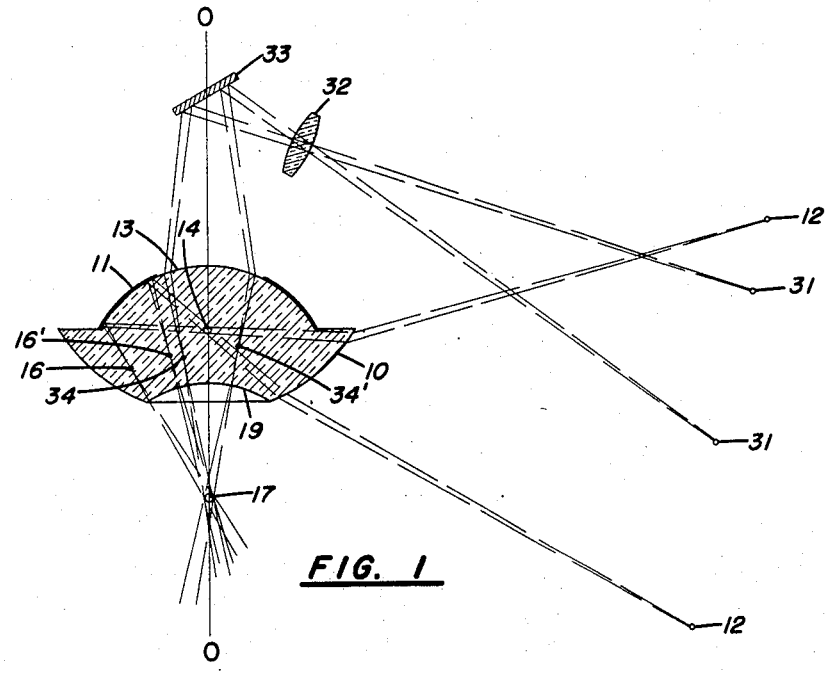
Fig. 1 shows a section of the optical system on its vertical axis and designed so that the major fraction of its field of view is below the horizon.

Referring now to Fig. 1, the unitary system is positioned on its vertical optical axis represented by the line O—O. The system proper has a refracting surface 10 and a positive power mirror represented by reflecting surface at 11. These two surfaces both have their centers in the common optical axis O—O.

In practice light is emitted from object points such as indicated at 12 and passes through the convex refracting surface 10, through the entrance pupil 14 on to concave mirror 11 from whence it is reflected to form an image at points 16, 16'. The light then passes through an exit pupil indicated at 17 at which the image at points 16, 16' may be observed as desired by the eye, a camera or other optical instruments.

Fields of view having fractions both above and below the horizon give satisfactory image definition. An illustrative example of the field of view of the modification of Fig. 1 is 2 degrees above and 36 degrees below the horizon. The aperture shown at 13 enables the utilization of a telescope to scan the panorama at a magnification. Light is emitted from object points in a portion of the panorama field such as indicated at 31, and the light passes through a suitable telescope objective lens 32 to a mirror 33, from whence it is reflected to form an image at 34, 34'. The light then passes through the exit pupil indicated at 17.

Figure 2:
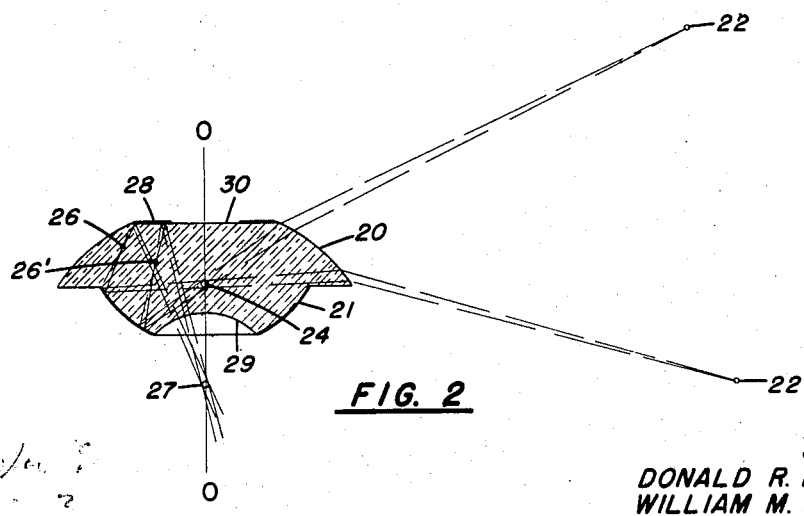
Fig. 2 shows an arrangement in which the major fraction of the field of view is above the horizon.

When the major field factor is above the horizon the incoming light emitted from the object takes a somewhat different path than described above. As will be seen in Fig. 2 the light from object point 22 is refracted by surface 20 through entrance pupil 24 on to concave mirror 21 from whence it is reflected to form an image at 26, 26'. This image is reflected from ring shaped mirror 28 through exit pupil indicated at 27 from which the image may be observed as desired by the eye, a camera or other optical instrument.

As in Fig. 1 a schematically shown aperture at 30 enables the utilization of a telescope (not shown) to scan the panorama at a magnification. The similarity of the modifications is readily apparent the structure of Fig. 2 differing from Fig. 1 in the provision of a mirror ring and the relative structural position of lens portions of 19 and 29.

It will be seen that both the refracting surface and the reflecting surface which receives the refracted rays have simple spherical curvatures of different radius. The system retains the useful or advantageous features of prior systems in addition to providing new advantages and a simple rugged construction.

The shown and described embodiments are illustrative and not limitative of the invention; it being desired to secure by the appended claims all the coverage to which applicant is entitled by law without disclaimer of any subject matter.

What is claimed is:
1. A unitary optical system comprising a mirror surface concave to the interior of said system, a positive power refracting surface concave to the interior of said system and also coaxial and concave to said mirror, a reflecting ring in the central area of said refracting surface and a light transmitting surface centrally of said mirrored surface, said refracting surface transmitting all incident pencils of light from an object, across the optical axis between the poles of said refracting surface and said mirror surface, from which said pencils of light are reflected to said mirror ring from which the pencils of light are reflected through said light transmitting portion.

2. A unitary catadioptric lens system comprising a single element having convex surfaces coaxially positioned on and generated about the same optical axis, one of said convex surfaces being a light refracting surface, another of said convex surfaces having light reflecting means thereon to form a concave reflector toward the interior of the lens, said concave reflector being axially spaced from said convex refracting surface whereby an image of a distant object is refracted by the refracting surface and focused by the reflector surface at its short conjugate focus.

3. A unitary catadioptric lens system as in claim 2 wherein one of said surfaces has a light transmitting surface thereon whereby the object focused by the reflector surface is viewable at an exit pupil substantially at the center of curvature of said light transmitting surface.

4. A unitary catadioptric lens system as in claim 3 wherein the light transmitting surface is concave.

5. A unitary catadioptric lens system comprising a single element having a convex refracting surface and a concave reflecting surface, one of said surfaces having a concave light transmitting surface therein, said refracting surface, reflecting surface and said light transmitting surface all being positioned on and generated about the same optical axis, said reflecting surface being concave toward the interior of said lens system and axially spaced from said refracting surface, whereby the image of distant objects refracted by said refracting surface is focused by said concave reflector at its short conjugate axis and is viewable at an exit pupil substantially at the center of curvature of said light transmitting surface.

6. A unitary catadioptric lens systems as in claim 5 wherein the light transmitting surface is positioned on the refracting surface.

7. A unitary catadioptric lens system as in claim 5 wherein the light transmitting surface is positioned on the reflecting surface.

8. A unitary catadioptric lens system as in claim 7 wherein a reflector ring is positioned on the refracting surface whereby the object focused by the reflecting surface is reflected by the reflecting ring toward the light transmitting surface.

DONALD ROBERT BUCHELE.
WILLIAM MARTIN BUCHELE.

References Cited in the file of this patent

UNITED STATES PATENTS

| Number | Name | Date |
|---|---|---|
| 929,795 | Siedentopf | Aug. 3, 1909 |
| 1,616,297 | Parodi | Feb. 1, 1927 |
| 1,653,575 | Kirtane | Dec. 20, 1927 |
| 1,797,867 | Karnes | Mar. 24, 1931 |
| 2,097,494 | Lihotzky | Nov. 2, 1937 |
| 2,176,554 | Hardy | Oct. 17, 1939 |
| 2,244,235 | Ayres | June 3, 1941 |
| 2,477,331 | Epstein | July 26, 1949 |

FOREIGN PATENTS

| Number | Country | Date |
|---|---|---|
| 15,188 | Great Britain | of 1908 |
| 125,374 | France | June 29, 1878 |
| 338,386 | France | May 17, 1904 |